Figure 1:
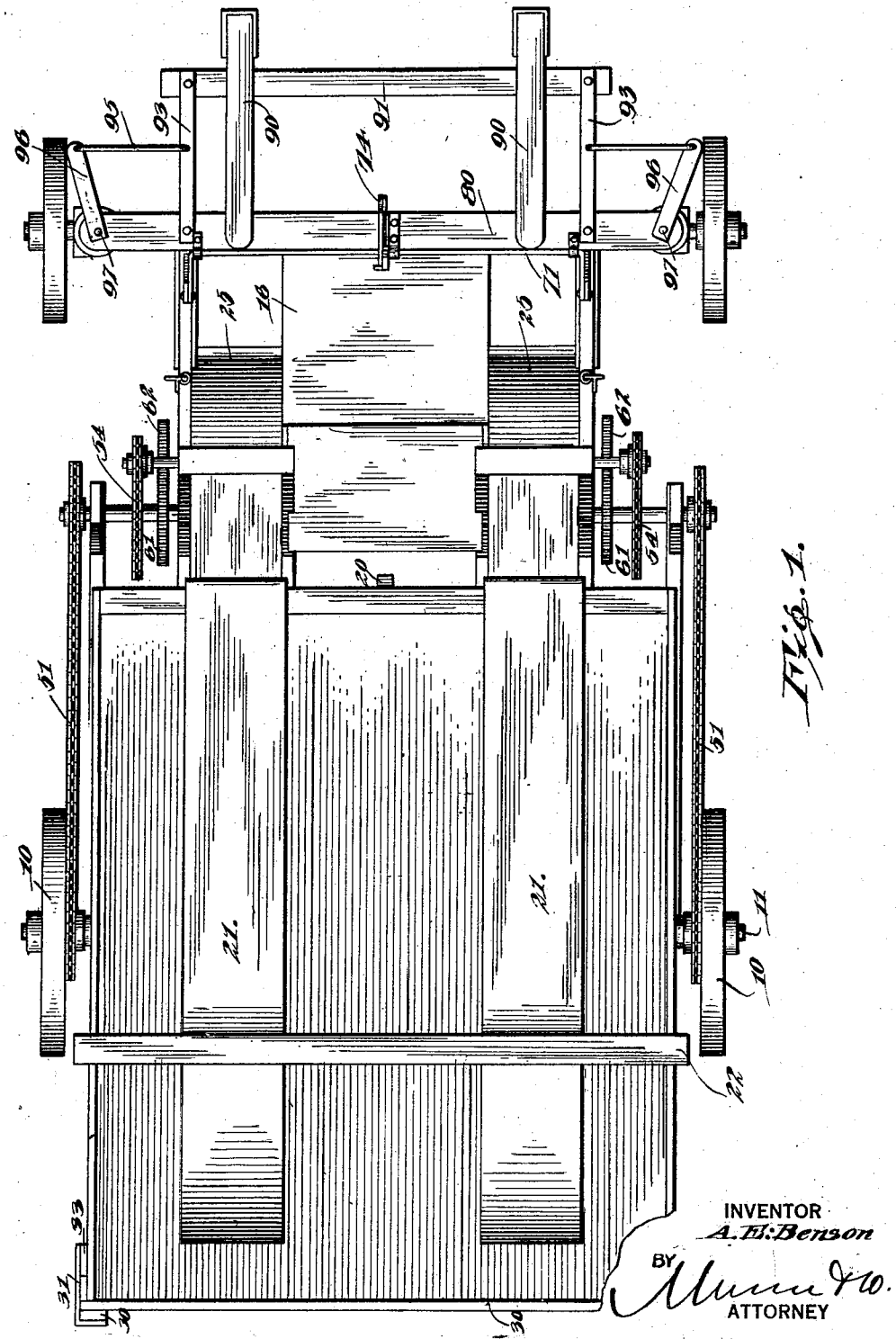

June 3, 1930. A. E. BENSON 1,762,045
COTTON HARVESTER
Filed May 31, 1928 5 Sheets-Sheet 1

INVENTOR
A. E. Benson
BY
ATTORNEY

June 3, 1930.　　　A. E. BENSON　　　1,762,045
COTTON HARVESTER
Filed May 31, 1928　　5 Sheets-Sheet 2
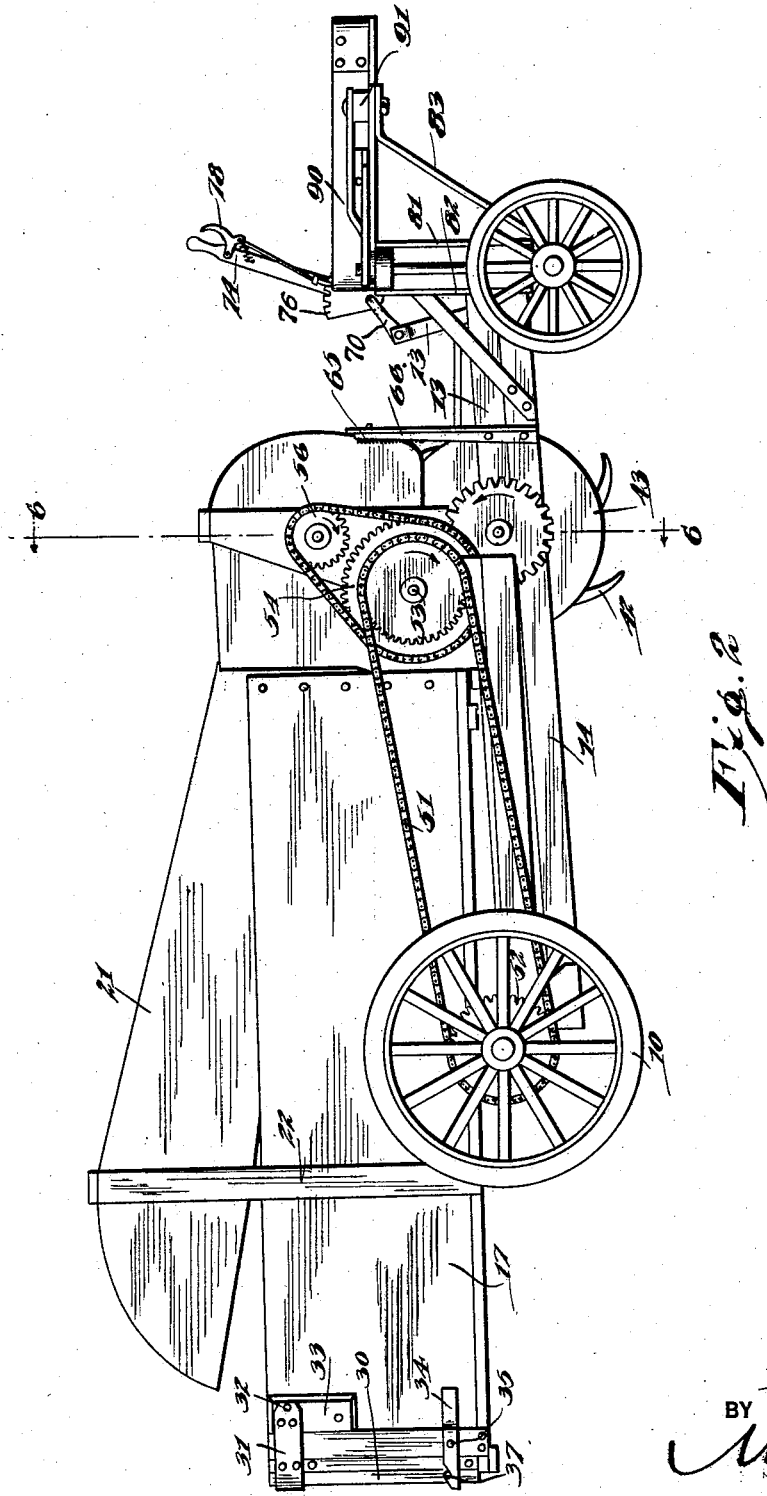
INVENTOR
A. E. Benson,
BY
ATTORNEY

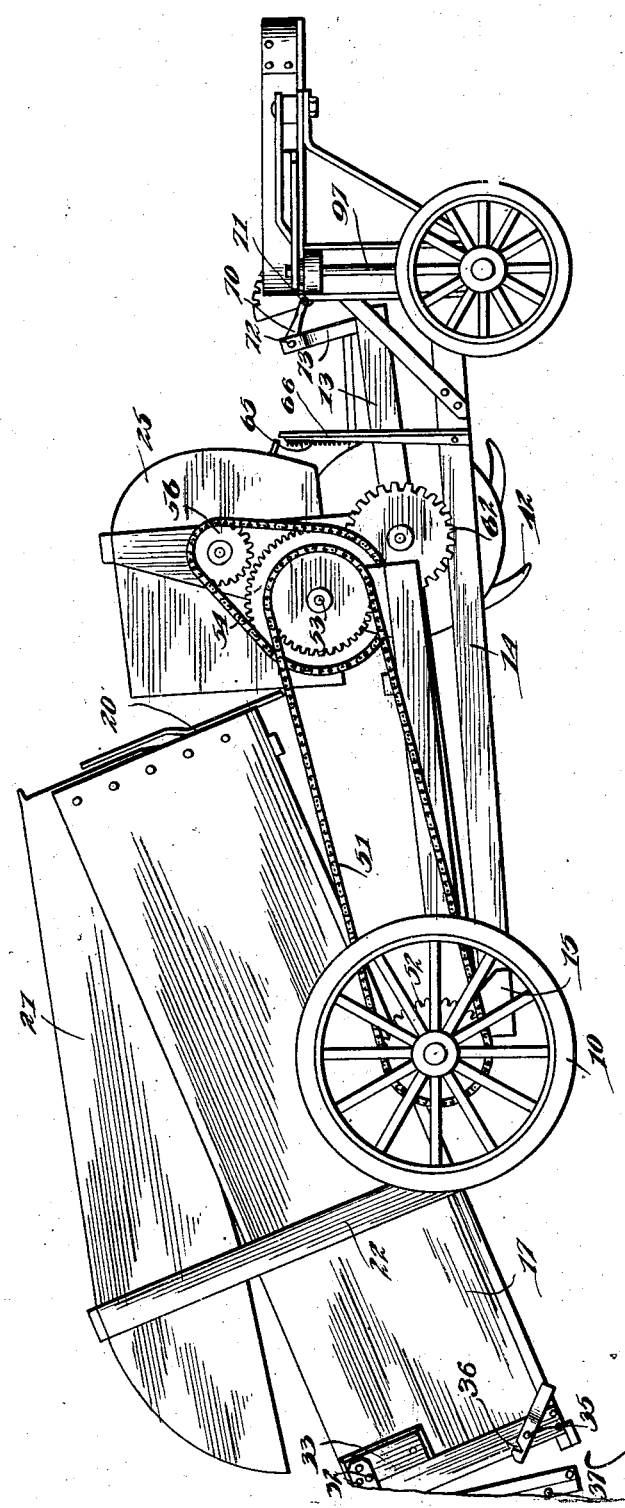

June 3, 1930.  A. E. BENSON  1,762,045
COTTON HARVESTER
Filed May 31, 1928   5 Sheets-Sheet 4
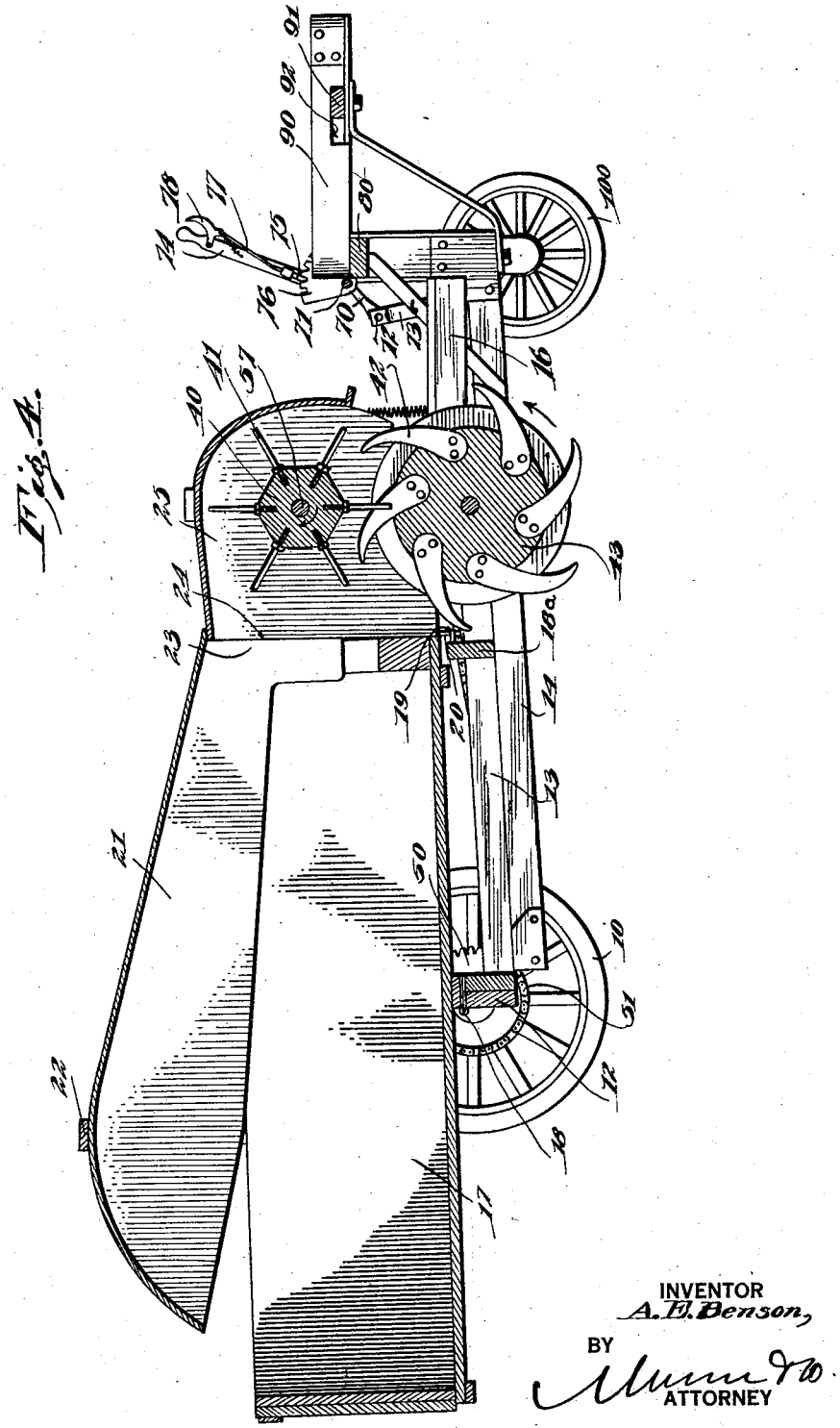
INVENTOR
A. E. Benson,
BY
ATTORNEY

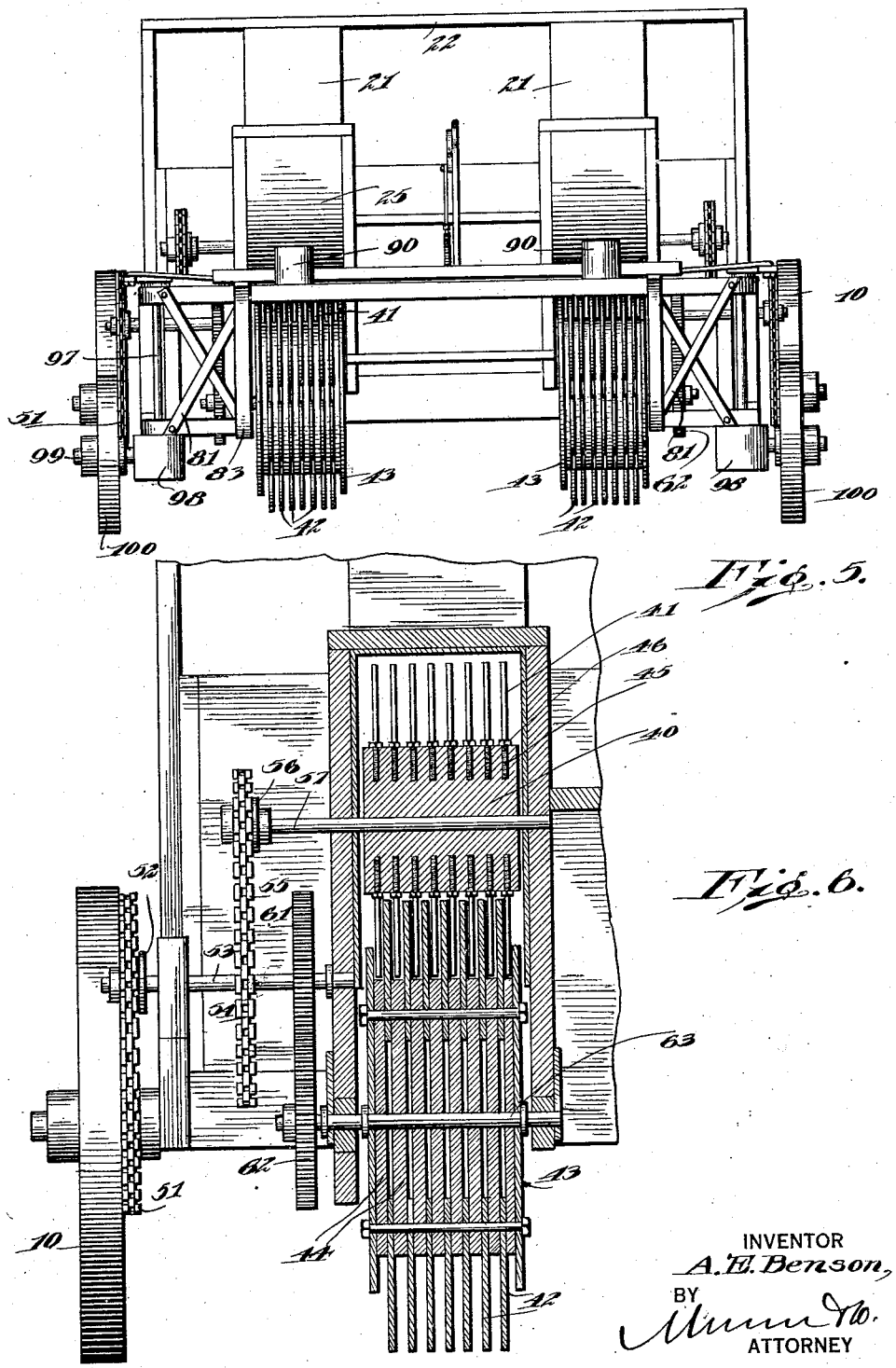

Patented June 3, 1930

1,762,045

UNITED STATES PATENT OFFICE

ARTHUR E. BENSON, OF CLARENDON, TEXAS

COTTON HARVESTER

Application filed May 31, 1928. Serial No. 281,794.

This invention relates to cotton harvesters.

An object of the invention is the provision of a vehicle adapted to be drawn or propelled through a cotton field, and in connection with the cotton plants for removing the cotton and collecting the same within a body mounted on the vehicle.

Another object of the invention is the provision of a cotton harvester in the form of a vehicle adapted to be drawn over rows of cotton plants with means incorporated in the vehicle for removing the cotton from plants and discharging them into a body mounted on a frame of the vehicle, the body being hingedly connected to the frame while the frame in turn is connected to a second frame supported by the four wheels of the vehicle.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a plan view of a cotton picker constructed according to the principles of my invention, Figure 2 is a side view in elevation showing the body in a normal position, Figure 3 is a side view in elevation of the cotton harvester showing the body of the vehicle in dumping position, Figure 4 is a horizontal vertical section through the cotton picker, Figure 5 is a front end view of the same, Figure 6 is a fragmentary vertical section taken along the line 6—6 of Fig. 2.

Referring more particularly to the drawings, 10 designates a pair of rear wheels adapted to be revolved by drawing the vehicle over the ground. An axle 11 is supported by the wheels. A pair of beams 12 are connected to the axle in any approved manner.

A frame generally designated by the numeral 13 is secured to the beams 12 and longitudinal beams 14 are provided with plates 15, which are pivotally connected to the longitudinal beams and frame 13, so that the front end 16 of the frame 13 is movable away from the front end of the beams 14.

The body 17 of rectangular shape, is hingedly connected intermediate the ends at 18, to the beams 12, whereby said body may be tilted at an angle for releasing the materials in the body. The front end of the body is adapted to rest upon a transverse beam 18ª and is locked to said beam by means of a pin 19 projecting through said beam and engaging by a hook 20, pivotally connected to the front end of the body 17.

The body is provided with a pair of sections 21 of a plurality of hoods, and each section is rigidly connected by means of a strap 22. The inner end of the hood is open, as shown at 23, and is adapted to be aligned with the rear opening 24 of a section 25 of the hood.

The rear end of the body is open and is provided with a hinged closure 30. This closure is rigidly connected with a U-shaped strap 31 pivotally connected at 32 to a cleat 33 which is secured to the side walls of the body 17. A latch 34 is pivotally connected at 35 on the body member 17, and is provided with a notch 36 adapted to engage the pin 37 of the closure 30 for locking the closure in position.

Mounted in each section 25 of the hood is a drum 40 having radially disposed teeth 41 moving in close association and in cooperation with curved fingers 42 secured to a drum 43. The drum may be hollow or may be in the form of a plurality of discs 44 rigidly bolted together with the curved teeth 42 located between the discs and secured thereto. The drum 40 may be solid with the teeth 41 having their inner ends threaded, as shown at 45, into radial passages, with nuts 46 for locking the teeth against displacement.

Each of the wheels 10 are provided with a sprocket 50 around which a chain 51 is trained. This chain also is trained around to drive a sprocket 52 on a shaft 53 carried by the frame. A sprocket 54 driven by the shaft 53 drives the chain 55 and likewise the sprocket 56 rigid with the shaft 57. The shaft 57 is rigidly secured to the drum 40. A gear 61 secured to the shaft 53 meshes with a gear 62 rigid with a shaft 63. This shaft is secured in any approved manner to the drum 43.

The front end of the frame 13 is supported by means of springs 65 which are connected to the upper ends of brackets 66 and also to side beams of the frame 13. The brackets 66 are secured to the longitudinal beams 14. A lever 70 is rigid with a shaft 71 and is pivotally connected at 72 with a link 73. This link is pivotally connected to the front end of the frame 13. A hand lever 74 is rigid with the shaft 71 and carries a dog 75 adapted to engage the teeth of a rack 76 which is secured to the beam 80 in any appropriate manner. The dog is actuated by means of a link 77 and a hand lever 78 pivoted on the lever 74.

A transverse beam 80 is secured to the front ends of the beams 14 and supported above said beams by means of brackets 81 and 82. The bracket 81 is reinforced by a bar 83. Bars 90 are secured to the transverse beam 80 and extend forwardly of the vehicle. An oscillating bar 91 is mounted within slots 92 in the bars 90 which act as a guide for the bar 91. This bar is connected by means of links 93 with the beam 80. A link 95 connects one end of a lever 96 with the links 93. A vertical shaft 97 mounted at each end of the beam 80 is rigid with the lever 96. The lower end of each shaft 97 is connected with a bearing 98 which carries a stub axle 99 for supporting a front wheel 100. Rocking of the shaft 97 causes oscillation of the front wheel 100. The transverse bar 91 is adapted to be connected with the usual single or double tree for propelling the vehicle by means of horses. Any method of drawing the vehicle may be employed.

The operation of my device is as follows: The vehicle is drawn through a cotton field in such a manner that the fingers of both of the spaced drums 43 are disposed over the cotton plants so that when the vehicle is drawn and the drum is revolved in the direction indicated by the arrow in Fig. 3, the fingers will be moved upwardly and into the sections 25 of the hood, and the cotton is picked off the fingers by means of teeth 41 on the drum 40. Due to the speed of revolution of the drum 40, the cotton is thrown into the sections 21, where it is deposited within the body 17 of the vehicle.

When it is desired to dump the body it is only necessary to release the latch 34 for opening the closure 30. The lever 74 is then moved forwardly after the dog 75 has been released and the front end 16 of the frame 13 is elevated, thereby raising the forward end of the body 17. When the lever 76 is moved forwardly, the shaft 71 is rocked thereby rocking the cranks 70 to the position shown in Figure 3. The raising of the outer ends of the cranks, elevates the link 73 and likewise the forward end of the frame 13. If a complete dumping of the body is desired, the latch 20 is actuated to release the body from the frame 13 whence the body may be tilted on its hinge 18. When the body 17 is tilted on its hinge, the hood 21 which is fixed to the body is likewise elevated and moved out of engagement with the rear end 24 of the section 25 of the hood.

I claim:—

1. A device of the character described comprising a frame, a body on the frame, a hood having one portion in open communication with the body, an inverted U-shaped channel section inclined at an angle to the body and having the inner end in open communication with the hood, the bottom of the channel section being open to the body, a drum provided with fingers and rotatably mounted in the hood, a second drum provided with curved fingers disposed in cooperative association with the first mentioned fingers for supplying cotton to said fingers, the first mentioned fingers being adapted to throw the cotton into the channel sections whence said cotton is directed into the body and means for revolving the drums.

2. A device of the character described comprising a frame, wheels for supporting the frame, a body on the frame, a hood having one portion in open communication with the body, a drum provided with fingers and rotatably mounted in the hood, a second drum provided with curved fingers movable in cooperative relation with the first mentioned fingers, the first mentioned fingers being adapted to remove cotton from the curved fingers and to throw the cotton from the hood towards the bottom, means associated with the body for directing cotton downwardly into the body, and means operatively connecting the drums with the wheels.

3. In a device of the character described, a cotton picking means comprising a plurality of spaced discs, curved fingers having the inner ends thereof secured to one face of a disc, and means for securing the discs together as a unit, the inner ends of the fingers acting to space the discs apart, and means for rotatably mounting the unit of secured discs.

ARTHUR E. BENSON.